United States Patent Office 2,740,787
Patented Apr. 3, 1956

2,740,787

EXTRACTION AND RECOVERY OF ALKALOIDS

Charles L. Mehltretter and Francis B. Weakley, Peoria, Ill., assignors to the United States of America as represented by the Secretary of Agriculture No Drawing. Application May 22, 1953,
Serial No. 356,918

5 Claims. (Cl. 260—285)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This application is a continuation-in-part of Serial No. 290,110, filed May 26, 1952, now abandoned.

This invention relates to the extraction and recovery of alkaloids from plant materials containing them. It relates, particularly, to the recovery of morphine and the associated alkaloids from *Papaver somniferum* by a combined extraction and ion exchange method of recovery.

The opium poppy, *Papaver somniferum*, produces recoverable quantities of valuable alkaloids, such as morphine, codeine, and the like. These may be recovered from the plant by incising the poppy bud or capsule while in the growing state and gathering the dried exudate as opium.

The hand method of harvesting opium from poppies, as mentioned in the foregoing paragraph, involves a large amount of hand labor and is not satisfactory in regions where labor costs are significant. Numerous methods have been devised for extracting alkaloids from the poppy plant. For example, since the alkaloids are concentrated mainly in the capsules, these may be crushed and extracted with various solvents. The poppy heads and straw may be dried and extracted with aqueous solvents to obtain an extremely dilute aqueous solution of alkaloids which may then be re-extracted with organic solvents to obtain a more concentrated solution of the alkaloid. Alternatively, the aqueous extract, which may be acid in character, may be concentrated by evaporation and a crude opium-like residue obtained.

The disadvantages of the foregoing and other prior art methods for extracting alkaloids from the opium poppy are that the initial extracts are extremely dilute, and costly and tedious concentration methods are required. Moreover, the residues obtained as final products are frequently quite crude and require further costly separation procedure before the alkaloids may be obtained in a satisfactory state of purity.

According to this invention, the poppy straw extraction methods described in our copending application Ser. No. 290,109, filed May 26, 1952, Patent No. 2,715,627, and briefly referred to above, are carried out within certain critical limitations in such a way that the extraction may be combined with a subsequent ion exchange recovery method as will be described in detail below.

According to the aforementioned application, opium alkaloids are extracted from poppy plant material such as the dried capsules and stem portions by means of a binary alkaline solvent. The solvent is composed of a major portion of a lower alkanol having at least two carbon stems, such as the propanols, the butanols or the pentanols, or mixtures thereof. To the alkanol is added a minor proportion of water within the range of 1.0 to 2.0 parts by weight for each 10 parts of alkanol. Sufficient alkali is added to the solvent to convert the alkaloid salts in the poppy plant material to the free base form. The extract thus obtained is then treated, in accordance with this invention, to recover the dissolved alkaloid, in such manner that the extraction and recovery form a unitary process.

In general, the ion exchange material is the sulfonic acid type of ion exchange resin, such as the common sulfonated coal or sulfonated synthetic resin. The binary solvent extract obtained from the extraction step, being alkaline in character, requires that the ion exchange resin bed be in the hydrogen cycle. The alkalinity of the extract should be maintained at the minimum necessary for conversion of the alkaloids from the salt form to the free base form. Excess alkali over this amount merely uses up the capacity of the cation exchange bed.

The extraction step is carried out by subjecting the poppy straw to an aqueous solvent containing a lower aliphatic alcohol, particularly one having limited miscibility with water. An example is isobutanol. The extraction solvent also contains an alkaline agency which may be a volatile organic or inorganic base, such as ammonia or may be an inorganic base, such as an alkali metal hydroxide. The alkalinity of the solvent converts the alkaloid salts in the straw to the free base form. In this form in solution it is borne to a cation exchange resin bed in the hydrogen cycle where it is removed. Before being led to the cation exchange resin bed, water may be added to make up for that taken up by the straw during the extraction. Addition of water is not necessary, however. The effluent from the cation exchange resin bed is then passed through an anion exchange resin bed to purge the solvent of anionic impurities and some resinous material. The solvent is then recycled to the extraction step, after adjustment to the required alkalinity. The alkaloid removed from solution by the cation exchange substance may be recovered by elution with alkali. The alkaline effluent from the elution step is then acidified to a pH of 4.0 to 7.0 to render the alkaloid more stable and convert it to the more soluble salt form. It is then evaporated to the desired degree of concentration. The concentrated acidic solution is made alkaline to convert the acid salt to the free base form of the alkaloid. It precipitates from concentrated aqueous solution in this form and may be recovered as the crude alkaloid.

The foregoing procedure is thus a unitary process which affords direct recycling of the solvent from the recovery step to the extraction step. Intermediary steps of filtration and solvent makeup may be inserted, for example, after the initial straw extraction. Likewise, intermediate filtration steps may be inserted in the treatment of the alkaline alkaloid-containing effluent from the cation exchange treatment. For example, the acidification of this effluent frequently causes the precipitation of impurities or insoluble salts. The crude alkaloid obtained by precipitation of the evaporated effluent with alkali may be further refined according to known methods to obtain pure morphine, codeine, etc.

After elution of the alkaloid from the cation exchange resin, the resin must be regenerated by treatment with acid in order to prepare it for a succeeding cycle of adsorption. For this reason, it is convenient to carry out the process with more than one cation exchange bed to permit alteration from one saturated bed to another freshly regenerated bed. In this manner, the steps of elution and regeneration can take place in one bed while the alternative bed or beds are being used to adsorb from the extraction solvent. This procedure permits continuous overall operation.

The following specific examples illustrate the invention.

EXAMPLE 1

A cation exchange bed was prepared containing 200 g. of Zeo-Karb H (a sulfonated coal resin in the hydrogen cycle). The bed was 2.5 in. in diameter and had a back-washed and drained volume of 560 ml. Since this type resin frequently has a greater volume when backwashed and drained in the sodium cycle, the cation exchanger should be designed accordingly. This bed was connected through a valved inlet situated above the bed, with an extractor which is the source of the aqueous alkanol extract previously described. The outlet was below the bed, thus providing for downflow during the adsorption step, and was connected directly with an acid-removing anion exchange column. Means were provided in the adsorption column for introducing wash water, alkaline solution and regenerating acid. Means were provided in the anion exchange column for the introduction of regeneration alkali.

One kg. of poppy straw, obtained by grinding the dried capsules and stem portions of the poppy plant, was extracted with isobutanol that was saturated with water at room temperature. The total amount of solvent used in this step was 5.2 l., to which 10 g. of ammonia had been added. This made the ammonia concentration in the solvent 0.23 percent by weight, and the weight ratio of straw to solvent of 1:4.3. The mixture was digested at 50°–60° C. with stirring for about 2 hrs.

After the extraction period, the extract was removed, and the residual straw was washed with fresh solvent of the same composition, exclusive of ammonia, for about 5 minutes with stirring. Both liquors were combined, yielding a total volume of 6.2 l. At this point, 0.34 l. of water was added to re-establish saturation, since water had been removed from the solvent by the straw during extraction. The extract was then passed continuously through the cation exchange bed and then directly through the anion exchange bed, the rate of feed being about 25 ml. per minute. The effluent was treated with 10 g. of ammonia and recycled to extract 1 kg. of fresh straw. The cycle was repeated, adding the necessary amount of water to reach saturation after the extraction step and adding sufficient ammonia to the effluent from the anion exchange bed to bring the ammonia concentration to 0.23 percent by weight.

Between each cycle the cation exchange bed was eluted with 0.6 l. of 4 percent sodium hydroxide, added in successive half portions, followed by two water washes of 0.3 l. each, and a separate acid regeneration wash to convert the bed to the hydrogen cycle and thus ready it for subsequent adsorption. Alternatively the elution step may be accomplished by eluting with 0.6 l. of 4 percent sodium hydroxide and aerating vigorously to agitate the bed, and then draining the bed while rinsing with 1.0 l. of water.

The alkaline eluates were acidified immediately to pH 4.5 to 7 with sulfuric acid and filtered to remove precipitated material. After filtration, the solution containing relatively stable sulfate salts of the extracted alkaloids was concentrated to about 200 ml. under reduced pressure and again filtered to remove precipitated material. The clear filtrate was then adjusted to pH 6.5–9.5 with concentrated ammonium hydroxide to precipitate the crude alkaloids. The alkaloids were filtered from the mother liquor, dried and analyzed for morphine content.

After the cycle of extraction, adsorption, and anion exchange had been repeated a number of times to establish equilibrium conditions between the ion exchange resins and the solutions, it was found that 94 percent of the morphine introduced to the bed could be recovered as the precipitated product, taking into account the amount found in the mother liquor. The data characterizing the extraction, after equilibrium conditions, are tabulated below. The variation in recovery yield, particularly of the first run in the table, is caused by the recovery of morphine that had not been completely removed from the cation exchange bed in previous runs. The fourth run tabulated represents equilibrium conditions.

Table.—*Ion exchange adsorption and recovery of morphine from extracts of one kilogram of poppy straw utilizing recycled ammoniacal, water-saturated isobutanol*

| Run No. | Morphine | | | | | | | | Ash (sulfated) in iso-butanol effluent (grams) |
|---|---|---|---|---|---|---|---|---|---|
| | Grams | | | | | | Percent | | |
| | In iso-butanol influent to zeo-karb H bed | In iso-butanol effluent of beds | Adsorbed by zeo-karb H bed | Displaced from zeokarb H bed | In crude precipitate (DB) | In mother liquor | Purity of crude precipitate | Recovery | |
| A | 5.4 | 1.1 | 4.3 | 6.9 | 6.1 | 0.4 | 79 | 142 | 0.27 |
| B | 5.2 | 0.2 | 5.0 | 6.3 | 5.2 | 1.1 | 80 | 104 | 0.13 |
| C | 5.1 | 1.1 | 4.0 | 4.5 | 2.6 | 0.8 | 75 | 65 | .00 |
| D | 5.4 | 0.6 | 4.8 | 5.6 | 4.5 | 1.2 | 73 | 94 | 0.42 |

The individual steps in the process of the foregoing example may be varied somewhat. For example, the weight ratio of straw to solvent is not critical. We prefer to operate with this ratio as low as will permit efficient agitation for reasons of economy. Likewise, the temperature of extraction may be varied. Satisfactory extraction occurs at room temperatures or below, even within periods of 2 hrs., but we prefer to employ slightly elevated temperatures with these extraction periods in order to insure maximum extraction efficiency. The straw, after extraction, may be pressed and the amount of wash solvent reduced considerably. Pressing, after extraction and washing, reduces the cost and equipment of solvent recovery from the exhausted straw.

The solvent to water ratio may be varied within the range previously mentioned. However, when using solvents which have their limit of water solubility within the designated range, such as isobutanol, it is convenient to operate at the saturation point of the solvent.

In the foregoing example any sulfonated low cross-linked cation exchange resin such as those previously mentioned may be substituted for the sulfonated coal resin used. The cation exchange material may also be varied somewhat in amount. The amount may be determined by precalculation, taking into account the quantity of straw to be extracted during each adsorption cycle, its alkaloid content, and the predetermined capacity of the particular material being used. We prefer to employ a slight excess of resin for batch adsorption. In continuous adsorption, we employ two beds in series, the overflow from the first being led through the second until the first becomes saturated.

The saturated column is cut out before recovery and the solution is led directly to the second. After recovery from the first bed and regeneration to convert it to the hydrogen cycle, it is placed in series behind the operating bed, and the cycle completed. Obviously, this manner of continuous adsorption may be varied to include multiple adsorption beds in series in any fashion desired within the skill of the operator. Similarly, the anion exchange procedure may be varied in kind of exchange material, quantity of such material and in the details of operation. It is merely necessary to remove the anions from the recycling solvent, as well as the other materials which are inherently removed by this general type of treatment.

Recovery of adsorbed alkaloid from the cation exchange material may be varied also. We prefer alkaline recovery, adding sufficient alkaline solution to remove the adsorbed alkaloid and convert the resin to the sodium cycle. Obviously, the quantity of eluting alkali should be kept to a minimum for economic reasons. We prefer 2 to 10 percent solutions of caustic alkali for reasons of convenience and economics, using no more than required, in order to minimize the volume of eluate.

Acidification of the alkaline eluate should be carried out reasonably soon after elution to minimize oxidative or other chemical deterioration of the alkaloids. It should be carried out at least before any evaporation step. The degree of acidification preferably lies between the range of pH 4.0 to 7.0, but this may vary with conditions and with the type of acid employed. Since the purpose of the acidification is to convert the dissolved alkaloids to their salt form with the acidifying acid, when that is accomplished no more acid need be added. The reduction in volume of the acidified solution should be as much as can be done, taking into account costs balanced against recovery by direct precipitation. The degree of volume reduction carried out in the foregoing example is within the preferred range of 1:3 to 1:15. Within this range, satisfactory yields of crude alkaloid are obtained by reconverting the salts to the free alkaloid upon the addition of organic or inorganic bases, such as ammonia, sodium hydroxide, sodium carbonate, and the like.

The morphine in the filtrate from the morphine precipitation step can also be recovered by cation exchange with a sulfonic acid resin such as Zeokarb H, Duolite C-10, Amberlite IR-112 or Dowex 50-X1 or other low cross-linked sulfonic acid cation exchange resins. An example of this recovery follows.

EXAMPLE 2

During a process as described in Example 1, 1200 ml. of filtrate containing 3.72 g. of morphine was poured through a Duolite C-10 bed, and the effluent was found to contain only 0.32 g. of morphine. It was discarded. The bed was then treated with 500 ml. of 4 percent sodium hydroxide solution and aerated for 10 minutes and then drained while rinsing the bed with a liter of water. The total alkali eluate contained 2.56 g. of morphine and was neutralized with sulfuric acid (pH 6.9) and was combined with the main neutralized eluate for concentration and morphine recovery.

We claim:

1. A method for extracting and recovering opium alkaloids from poppy plant material comprising extracting the dried plant material with a binary solvent comprising a lower aliphatic alkanol containing at least 2 carbon atoms and water, the weight ratio of water to alkanol being within the range of 1.0-2.0:10, said solvent also containing sufficient alkali to convert the alkaloids of said plant material to the free base form, thus to obtain an extract of alkaloids, and passing the extract to a zone of cation exchange, the ion exchange substance being of the sulfonic acid type, whereby alkaloids from the solution are adsorbed, passing the effluent solvent through a zone of anion exchange, subsequently adding alkali to form an extracting solvent as previously defined, and continuously recycling said solvent to extract fresh poppy plant material; eluting adsorbed alkaloids from said cation exchange material with aqueous alkali, and regenerating said cation exchange material to the hydrogen cycle to receive more adjusted extract.

2. Method of claim 1 in which the eluted alkaline solution of alkaloid material is subsequently acidified to form acid salts thereof, evaporating said acidified solution to effect a substantial reduction in volume and recovering crude alkaloids by precipitation with alkali.

3. Method of claim 1 in which the cation exchange material is sulfonated coal.

4. Method of claim 1 in which the cation exchange material is a low cross-linked sulfonic acid resin.

5. Method of claim 2 in which morphine is recovered from the filtrate of the alkali precipitation step by a method comprising adsorbing on a cation exchange resin, and eluting adsorbed morphine with alkali.

References Cited in the file of this patent

UNITED STATES PATENTS

| | | |
|---|---|---|
| 2,132,945 | Frey et al. | Oct. 11, 1938 |
| 2,509,051 | Applezweig | May 23, 1950 |

FOREIGN PATENTS

| | | |
|---|---|---|
| 970,806 | France | June 28, 1950 |

OTHER REFERENCES

Mascre et al.: Ann. pharm. franc., vol. 7, pp. 493–502 (1949) as abstracted in Chem. Abst., vol. 44, p. 2174 (1950).

Applezweig et al.: Ind. and Eng. Chem., vol. 38, pp. 576–79 (1946).

Applezweig: J. Am. Chem. Soc., vol. 66, p. 1990 (1944).

Jindra et al.: J. Pharm. Pharmacol., vol. 1, pp. 87–94 (1949).